(12) United States Patent
Fan et al.

(10) Patent No.: US 12,555,629 B2
(45) Date of Patent: Feb. 17, 2026

(54) METHOD AND SYSTEM FOR A PROGRAMMABLE AND GENERIC PROCESSING-IN-SRAM ACCELERATOR

(71) Applicants: Deliang Fan, Tempe, AZ (US); Shaahin Angizi, Newark, NJ (US)

(72) Inventors: Deliang Fan, Tempe, AZ (US); Shaahin Angizi, Newark, NJ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 166 days.

(21) Appl. No.: 18/499,643

(22) Filed: Nov. 1, 2023

(65) Prior Publication Data
US 2024/0144998 A1 May 2, 2024

Related U.S. Application Data

(60) Provisional application No. 63/381,936, filed on Nov. 2, 2022.

(51) Int. Cl.
| | |
|---|---|
| *H03K 19/20* | (2006.01) |
| *G06N 3/06* | (2006.01) |
| *G11C 7/10* | (2006.01) |
| *G11C 11/412* | (2006.01) |
| *G11C 11/419* | (2006.01) |
| *G11C 11/54* | (2006.01) |

(52) U.S. Cl.
CPC .............. *G11C 11/419* (2013.01); *G06N 3/06* (2013.01); *G11C 7/1006* (2013.01); *G11C 11/412* (2013.01); *G11C 11/54* (2013.01); *H03K 19/20* (2013.01)

(58) Field of Classification Search
CPC ... G11C 11/419; G11C 11/412; G11C 7/1006; G11C 11/54; H03K 19/20; G06N 3/06
See application file for complete search history.

(56) References Cited

U.S. PATENT DOCUMENTS

| | | | |
|---|---|---|---|
| 10,073,733 B1* | 9/2018 | Jain | .............. G06F 11/1044 |
| 10,706,923 B2 | 7/2020 | Seo | |
| 2020/0279597 A1 | 9/2020 | Wang | |
| 2023/0031841 A1* | 2/2023 | Badaroglu | .......... G06F 15/7821 |
| 2023/0037054 A1* | 2/2023 | Wang | .............. G06N 3/048 |

(Continued)

OTHER PUBLICATIONS

A. Biswas et al., "Conv-sram: An energy-efficient sram with in-memory dot-product computation for low-power convolutional neural networks," IEEE JSSC, 2018.

(Continued)

*Primary Examiner* — Amir Zarabian
*Assistant Examiner* — Justin Bryce Heisterkamp
(74) *Attorney, Agent, or Firm* — Riverside Law LLP

(57) ABSTRACT

A system for in-memory computing comprises a volatile memory comprising at least a first layered subarray, wherein each subarray comprises a plurality of memory cells, and a plurality of sub-sense amplifiers connected to a read bitline of the first subarray of the memory, configured to compare a measured voltage of the read bitline to at least one threshold and provide at least one binary output corresponding to a logic operation based on whether the voltage of the read bitline is above or below the threshold. A method for in-memory computing is also disclosed.

19 Claims, 13 Drawing Sheets

(56) References Cited

U.S. PATENT DOCUMENTS

2023/0297331 A1* 9/2023 Fan .......................... G06F 7/02
 708/200
2024/0282366 A1* 8/2024 Jacob ..................... H10B 10/00

OTHER PUBLICATIONS

Amitesh Sridharan, Shaahin Angizi, Sai Kiran Cherupally, Fan Zhang, Jae-sun Seo, and Deliang Fan, "A 1.23-GHz 16-Kb Programmable and Generic Processing-in-SRAM Accelerator in 65nm," 48th European Solid-State Circuits Conference (ESSCIR), Milan, Italy, Sep. 19-22, 2022.

H. Valavi et al., "A 64-tile 2.4-mb in-memory-computing cnn accelerator employing charge-domain compute," IEEE JSSC, 2019.

J. Faraone et al., "Syq: Learning symmetric quantization for efficient deep neural networks," in CVPR, 2018.

J. Wang et al., "A 28-nm compute SRAM with bit-serial logic/arithmetic operations for programmable in-memory vector computing," IEEE JSSC, 2020.

J. Yue et al., "14.3 a 65nm computing-in-memory-based cnn processor with 2.9-to-35.8 tops/w system energy efficiency using dynamic-sparsity performance-scaling architecture and energy-efficient inter/intra-macro data reuse," in IEEE ISSCC, 2020.

M. Hutter et al., "A cryptographic processor for low-resource devices: Canning ecdsa and aes like sardines," in IFIP, 2011.

S. Mathew et al., "53gbps native gf (2 4) 2 composite-field aes-encrypt/decrypt accelerator for content-protection in 45nm highperformance microprocessors," in 2010 Symp.on VLSI. IEEE.

Y. Zhang et al., "Recryptor: A reconfigurable cryptographic cortex-m0 processor with in-memory and near-memory computing for iot security," IEEE JSSC, 2018.

* cited by examiner

METHOD AND SYSTEM FOR A PROGRAMMABLE AND GENERIC PROCESSING-IN-SRAM ACCELERATOR

CROSS-REFERENCE TO RELATED APPLICATIONS

This application claims priority to U.S. Provisional Patent Application No. 63/381,936, filed on Nov. 2, 2022, incorporated herein by reference in its entirety.

STATEMENT REGARDING FEDERALLY SPONSORED RESEARCH OR DEVELOPMENT

This invention was made with government support under 2003749 and 2144751 awarded by the National Science Foundation. The government has certain rights in the invention.

BACKGROUND OF THE INVENTION

Traditional von-Neumann computing architectures, such as central processing units (CPUs) and graphics processing units (GPUs), demonstrate limitations in memory bandwidth and energy efficiency. However, their high demand lies in their programmability and flexible functionality. Such platforms execute a wide spectrum of bit-wise logic and arithmetic operations. In this regard, recent application-specific processing-in-memory (PIM) designs suffer from the major challenge that their performance is intrinsically limited to one specific type of algorithm or application domain, which means that such PIM platforms cannot keep pace with rapidly evolving software algorithms (A. Biswas et al., IEEE JSSC, 2018).

To overcome this limitation, state-of-the-art generic and programmable PIM architectures (e.g., J. Wang et al., IEEE JSSC, 2020.) exploit alternatives to conventional bit-parallel algorithms. For example, it is possible to realize arithmetic operations using bit-serial algorithms. However, it comes at a cost of high latency and more intermediate data write-back if multiple computing cycles are needed for basic in-memory Boolean logic functions (A. Biswas et al., IEEE JSSC, 2018; J. Wang et al., IEEE JSSC, 2020; H. Valavi et al., IEEE JSSC, 2019; Y. Zhang et al., IEEE JSSC, 2018; J. Yue et al., in IEEE ISSCC, 2020.)

SUMMARY OF THE INVENTION

Described herein is a system for in-memory computing, comprising a volatile memory comprising at least a first layered subarray, wherein each subarray comprises a plurality of memory cells. The system also comprises a plurality of sub-sense amplifiers connected to a read bitline of the first subarray of the memory, configured to compare a measured voltage of the read bitline to at least one threshold and provide at least one binary output corresponding to a logic operation based on whether the voltage of the read bitline is above or below the threshold.

In some embodiments, the logic operation is selected from NOR, XOR, and NAND.

In some embodiments, the plurality of sub-sense amplifiers comprises three sub-sense amplifiers and wherein the at least one threshold comprises at least three thresholds, corresponding to NOR, XOR, and NAND logic operations.

In some embodiments, the system further comprising a multiplexer connected to the binary outputs of the plurality of sub-sense amplifiers, configured to select one of the binary outputs in response to a control signal.

In some embodiments, the memory is a random-access memory.

In some embodiments, the random-access memory is an in-processing static random-access memory (SRAM).

In some embodiments, each memory cell of the plurality of memory cells stores 2 bits.

In some embodiments, the plurality of memory cells are 8T SRAM cells.

In some embodiments, the multiplexer is selected from a 2:1 multiplexer, a 3:1 multiplexer, and a 4:1 multiplexer.

Also described herein is a method of in-memory computing, comprising storing a set of data in a layered subarray of a volatile memory, then comparing, with a set of sub-sense amplifiers, an analog voltage of a read bitline of the volatile memory to a set of corresponding voltage references, each voltage reference corresponding to a digital logic operation, then providing a set of corresponding binary output values from the sub-sense amplifiers, and finally selecting, with a multiplexer, one of the set of corresponding binary output values.

In some embodiments, the three memory rows are three operand vectors stored in a memory.

In some embodiments, the memory is a random-access memory.

In some embodiments, the random-access memory is an in-processing static random-access memory (SRAM).

In some embodiments, the method is performed in a single memory cycle.

In some embodiments, the set of corresponding binary output values are three-input logic operations.

In some embodiments, wherein the three-input logic operations are selected from XOR3, AND3, NOR3, and OR3.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
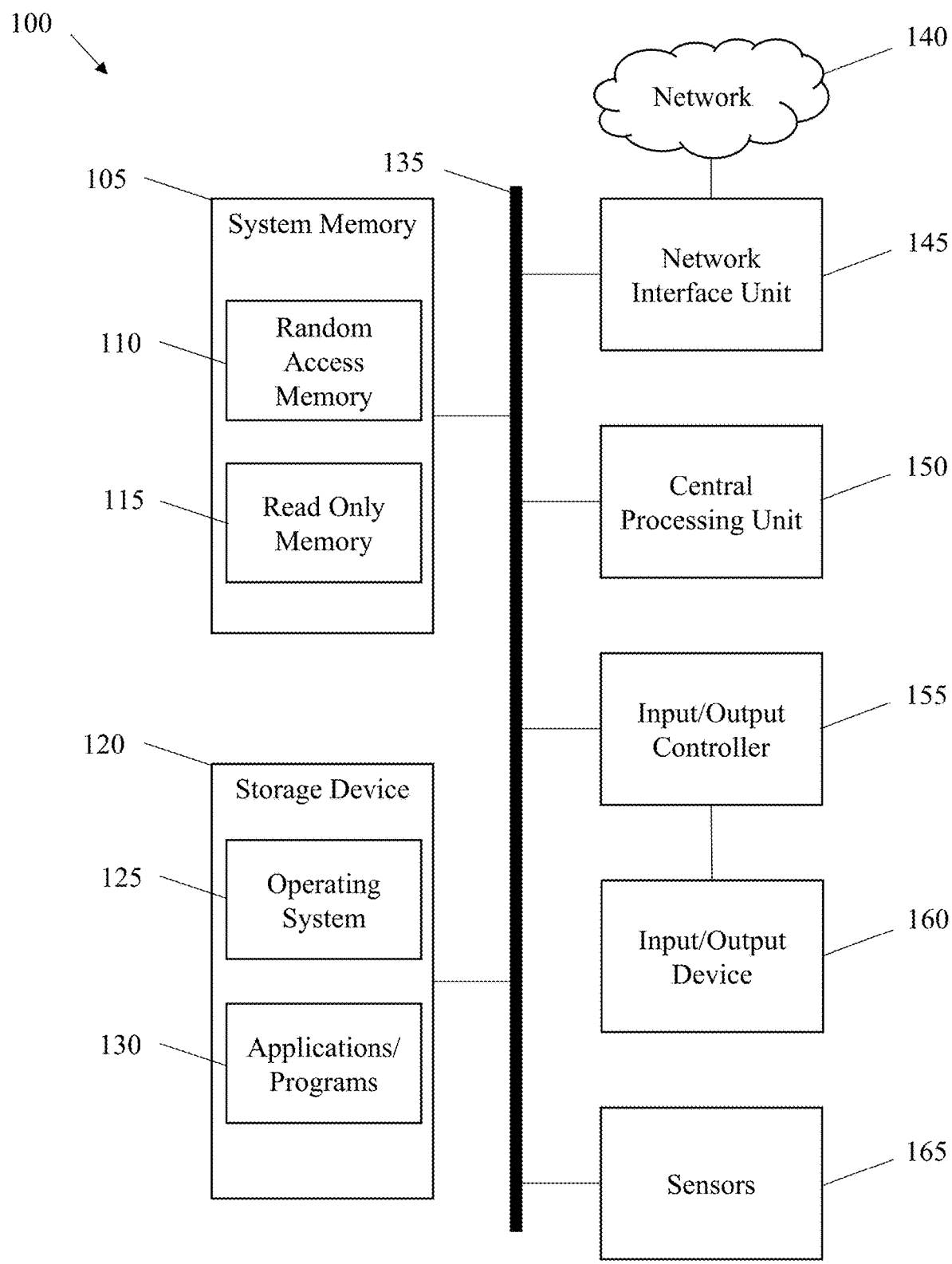
FIG. 1 is a diagram of a computing device.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Software & Computing Device

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

FIG. 1 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 depicts an illustrative computer architecture for a computer 100 for practicing the various embodiments of the invention. The computer architecture shown in FIG. 1 illustrates a conventional personal computer, including a central processing unit 150 ("CPU"), a system memory 105, including a random-access memory 110 ("RAM") and a read-only memory ("ROM") 115, and a system bus 135 that couples the system memory 105 to the CPU 150. A basic input/output system containing the basic routines that help to transfer information between elements within the computer, such as during startup, is stored in the ROM 115. The computer 100 further includes a storage device 120 for storing an operating system 125, application/program 130, and data.

The storage device 120 is connected to the CPU 150 through a storage controller (not shown) connected to the bus 135. The storage device 120 and its associated computer-readable media provide non-volatile storage for the computer 100. Although the description of computer-readable media contained herein refers to a storage device, such as a hard disk or CD-ROM drive, it should be appreciated by those skilled in the art that computer-readable media can be any available media that can be accessed by the computer 100.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information, and which can be accessed by the computer.

According to various embodiments of the invention, the computer 100 may operate in a networked environment using logical connections to remote computers through a network 140, such as TCP/IP network such as the Internet or an intranet. The computer 100 may connect to the network 140 through a network interface unit 145 connected to the bus 135. It should be appreciated that the network interface unit 145 may also be utilized to connect to other types of networks and remote computer systems.

The computer 100 may also include an input/output controller 155 for receiving and processing input from a number of input/output devices 160, including a keyboard, a mouse, a touchscreen, a camera, a microphone, a controller, a joystick, or other type of input device. Similarly, the input/output controller 155 may provide output to a display screen, a printer, a speaker, or other type of output device. The computer 100 can connect to the input/output device 160 via a wired connection including, but not limited to, fiber optic, Ethernet, or copper wire or wireless means including, but not limited to, Wi-Fi, Bluetooth, Near-Field Communication (NFC), infrared, or other suitable wired or wireless connections.

As mentioned briefly above, a number of program modules and data files may be stored in the storage device 120 and/or RAM 110 of the computer 100, including an operating system 125 suitable for controlling the operation of a networked computer. The storage device 120 and RAM 110 may also store one or more applications/programs 130. In particular, the storage device 120 and RAM 110 may store an application/program 130 for providing a variety of functionalities to a user. For instance, the application/program 130 may comprise many types of programs such as a word processing application, a spreadsheet application, a desktop publishing application, a database application, a gaming application, internet browsing application, electronic mail application, messaging application, and the like. According to an embodiment of the present invention, the application/program 130 comprises a multiple functionality software application for providing word processing functionality, slide presentation functionality, spreadsheet functionality, database functionality and the like.

The computer 100 in some embodiments can include a variety of sensors 165 for monitoring the environment surrounding and the environment internal to the computer 100. These sensors 165 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

Presented herein is a generic and programmable processing-in static random-access memory (PSRAM) accelerator chip design based on an 8TSRAM array to accommodate a complete set of Boolean logic operations (e.g., NOR/NAND/XOR, both 2- and 3-input), majority, and full adder, all in a single cycle. PSRAM provides the programmability required for in-memory computing platforms that could be used for various applications such as parallel vector operation, neural networks, and data encryption. The prototype design may be implemented in a SRAM macro with size of 16 kilobytes, demonstrating one of the fastest programmable in-memory computing systems to date operating at 1.23 gigahertz. The 65 nm prototype chip achieves system-level peak throughput of 1.2 tera operations per second (TOPs), and energy-efficiency of 34.98 TOPs/W at 1.2 volts A programmable processing-in-SRAM accelerator (PSRAM) as disclosed herein combines the PIM computation efficacy with programmability. Furthermore, the one-cycle in-memory Boolean logic design also eliminates redundant intermediate data write-back operations for 3-input logic and full adder that typically need multiple cycles with extra latency and energy in prior multi-cycle in-memory logic designs (A. Biswas et al., IEEE JSSC, 2018; J. Wang et al., IEEE JSSC, 2020; H. Valavi et al., IEEE JSSC, 2019; Y. Zhang et al., IEEE JSSC, 2018; J. Yue et al., in IEEE ISSCC, 2020.)

Also disclosed herein are three case studies leveraging the PSRAM design, including parallel vector operation, neural networks, data encryption, etc. PSRAM paves a new path to a generic, programmable, and fast in-SRAM computing platform. In some embodiments, the disclosed PSRAM may be used for applications including but not limited to bulk bitwise vector operations, low-precision deep learning acceleration, and the Advanced Encryption Standard (AES) computation.

The design proposed herein may further be used in applications involving graph processing tasks widely used in social networks analysis, such as tools used to understand behavior between individuals or organizations through their linkages. Furthermore, the PSRAM design may also be utilized in bioinformatics tasks such as DNA alignment and DNA assembly.

Proposed PSRAM Design

Figure 3A:
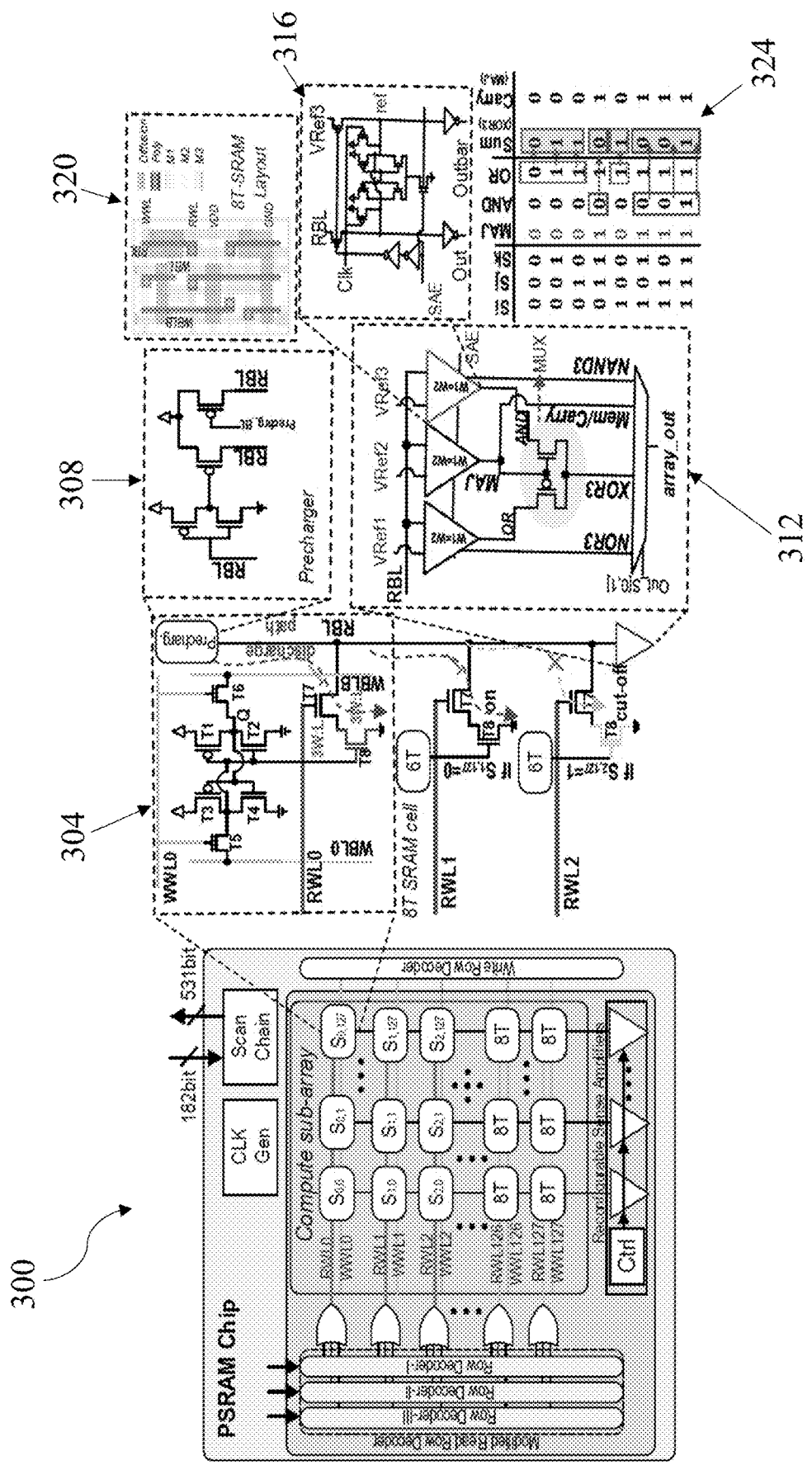
FIG. 3A shows an exemplary PSRAM chip with 8T SRAM cell as the operand memory and the proposed single-cycle logic-SA design.

With reference to FIG. 3A, an exemplary architecture for a PSRAM chip with an 8T SRAM cell as the operand memory is shown with a single-cycle logic-sense amplifier (logic-SA). In the figure, section 304 is a detail view of a memory cell, section 308 displays the precharger, including the Read-Bit Line, section 312 shows the logic-SA structure, including the subsense amplifiers, voltage references, and support circuitry used to output the various logic functions. Section 316 is a detail view of one subsense amplifier, section 320 shows the integrated circuit layout for an exemplary 8T SRAM design, and section 324 is a logic diagram showing the various logic function outputs. Each section is further explained below.

Figure 3B:
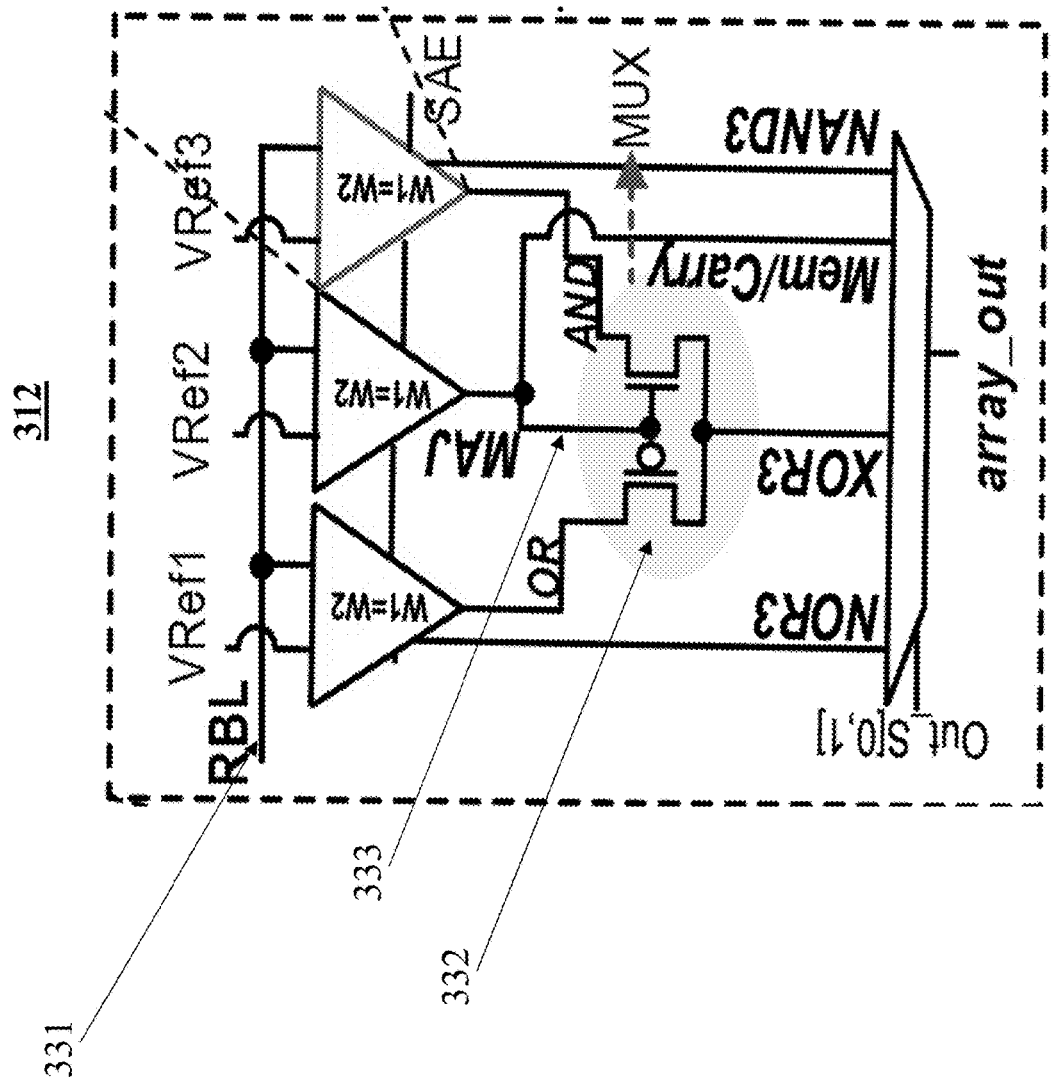
FIG. 3B shows a detail view of a logic-SA array.

With reference to FIG. 3B, the disclosed PSRAM design 300 leverages the charge-sharing feature of the 8T SRAM cell 304 on the Read Bit-Line (RBL) 331 and elevates it to implement 2-input and 3-input Boolean logic between two or three selected rows in a single memory read cycle. The key idea comes from the observation that the discharge rate on a precharged RBL is determined by the data value stored in the simultaneously selected memory cells attached to the precharged RBL. Memory cells are shown in section 304 and precharged RBL is shown in section 308 of FIG. 3A. For instance, by activating three memory rows via Read Word-Lines (RWL), such as RWL0-RWL2, if $S_{0,0}$, $S_{1,0}$, and $S_{2,0}$ memory cells all store '1's, then the read access transistors (T8, 341) remain OFF, and the RBL precharged voltage does not discharge. Activating the RWLs may be the first step of the in-memory computing process; when the RWL is activated, the RBL value changes accordingly and can be read later.

In another example, if all cells store '0's, the RBL voltage will rapidly discharge through all three T8s 341 in all three cells along the highlighted discharge path 342. Similarly, based on different combinations of the values stored in those memory cells, the discharged voltage value will be different if sampled at a preset frequency, which could be sensed by the follow up 'logic-sense amplifier (logic-SA)' design shown in FIG. 3B to implement different logic functions through comparing the voltage on the RBL to different voltage references at the appropriate time. In some embodiments, the preset frequency may be at least 400 MHz, at least 420 MHz, at least 450 MHz, at least 500 MHz, at least 600 MHz, at least 700 MHz, at least 800 MHz, at least 900 MHz, at least 1 GHz, at least 1.1 GHz, or at least 1.2 GHz. In some embodiments, the preset frequency may be between 400 MHz and 1.5 GHz, between 400 MHz and 1.4 GHz, between 400 MHz and 1.3 GHz, between 400 MHz and 1.23 GHz, between 420 MHz and 1.23 GHz, between 500 MHz and 1.23 GHz, between 600 MHz and 1.23 GHz, between 700 MHz and 1.23 GHz, or between 800 MHz and 1.23 GHz.

Figure 3C:
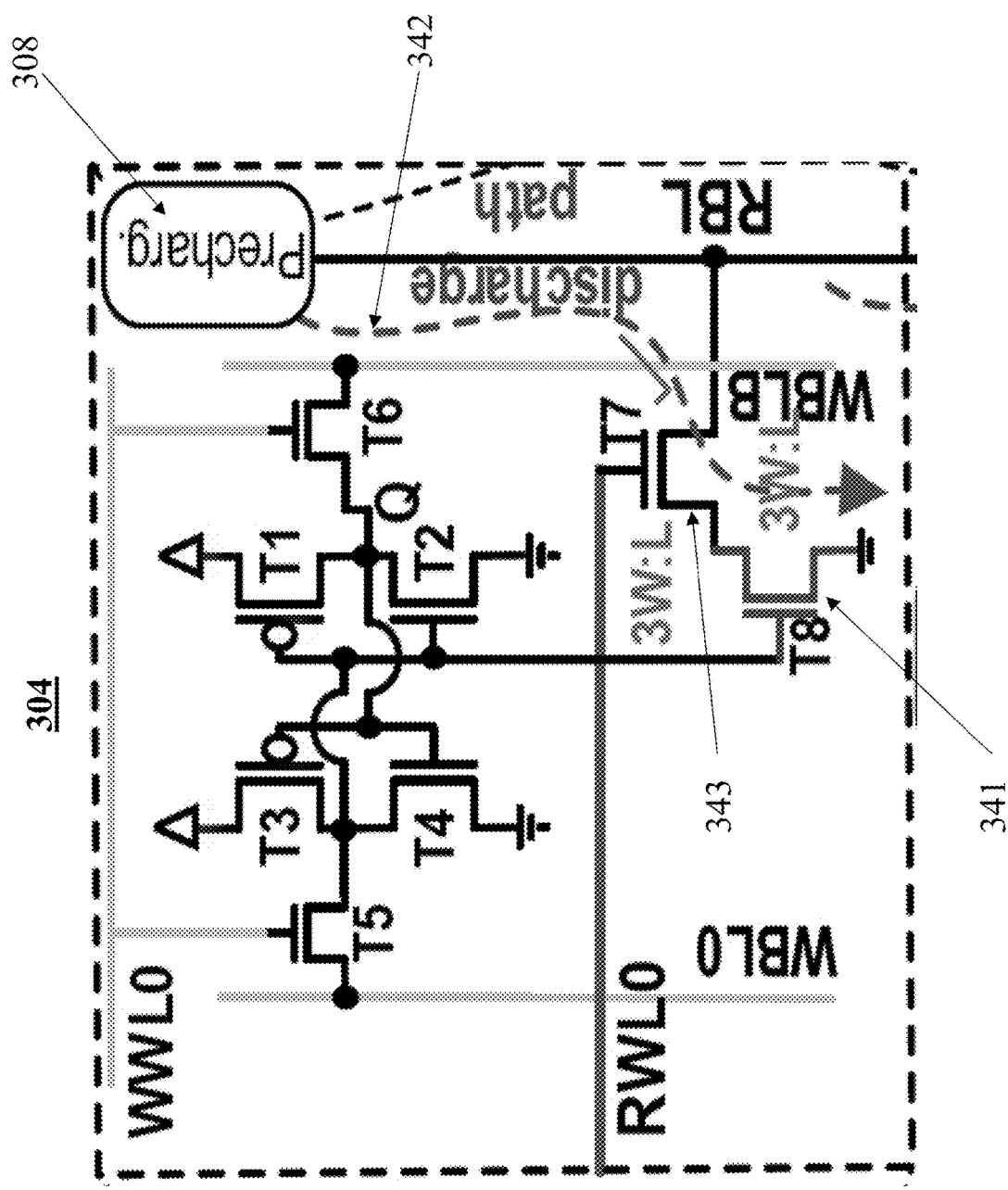
FIG. 3C shows a detail view of a memory cell.

Theoretically, there may be four different voltage levels based on all possible combinations of three memory cell data in the same bit-line. In one embodiment, the voltage values measured are the values when all three bits are '1,' when one bit is '0,' when two bits are '0,' and when all three bits are '0.' To yield a sufficiently large sense margin, as shown in Monte Carlo simulations in FIG. 7, the read path transistors T7 (343) and T8 (341) size may be designed to be 3× as shown in FIG. 3A and FIG. 3C. FIG. 3A and FIG. 3B also show the role of sense amplifiers in the system in sections 312 (see FIG. 3B) with a detail view in section 316, both of which are further explained below. Section 320 shows an exemplary 8T-SRAM layout of the design.

Figure 2:
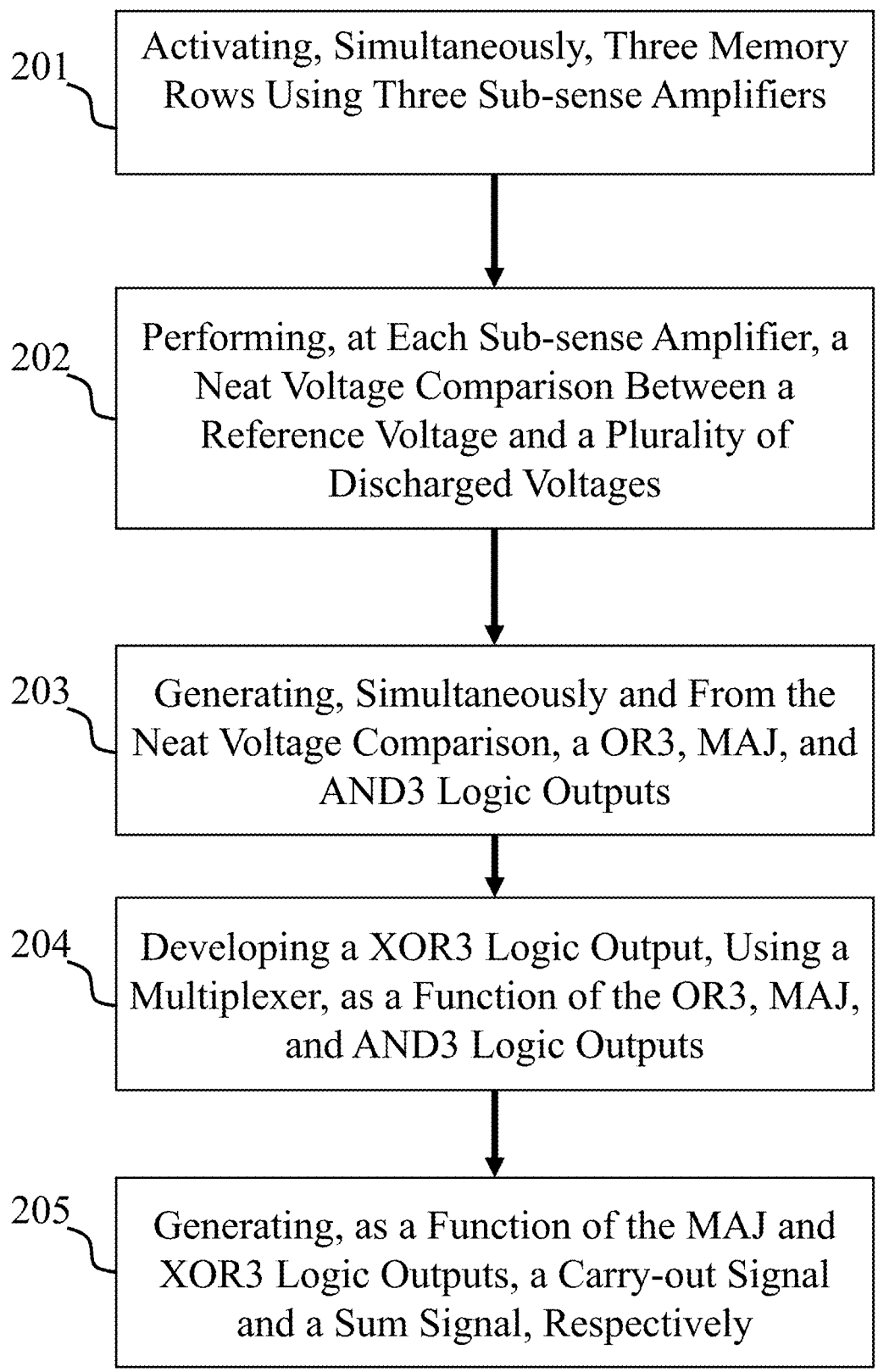
FIG. 2 is a diagram illustrating a method for implementation for a programmable and generic processing-in-SRAM accelerator.

Referring to the method shown in FIG. 2, to implement a programmable logic function, a new reconfigurable logic-SA is designed. It comprises three sub-sense amplifiers (sub-SAs) with voltage references (i.e., $V_{Ref1}<V_{Ref2}<V_{Ref3}$), as shown in FIG. 3B, each dedicated to a distinct logic function; an individual sense amplifier is portrayed in depth in section 316 of FIG. 3A as well. By activating three memory rows, as shown in step 201, such as input operand vectors, at the same time, each sub-SA performs a voltage comparison between the reference voltage and the discharged RBL voltage in step 202 and as seen in section 316 of FIG. 3A (with reference to different discharge rate corresponding to stored memory cell data), which respectively generates (N)OR3, (MAJ)MIN, and (N)AND3 logic output (complementary sense amplifier), and more importantly, at the same time in step 203.

Figure 4:
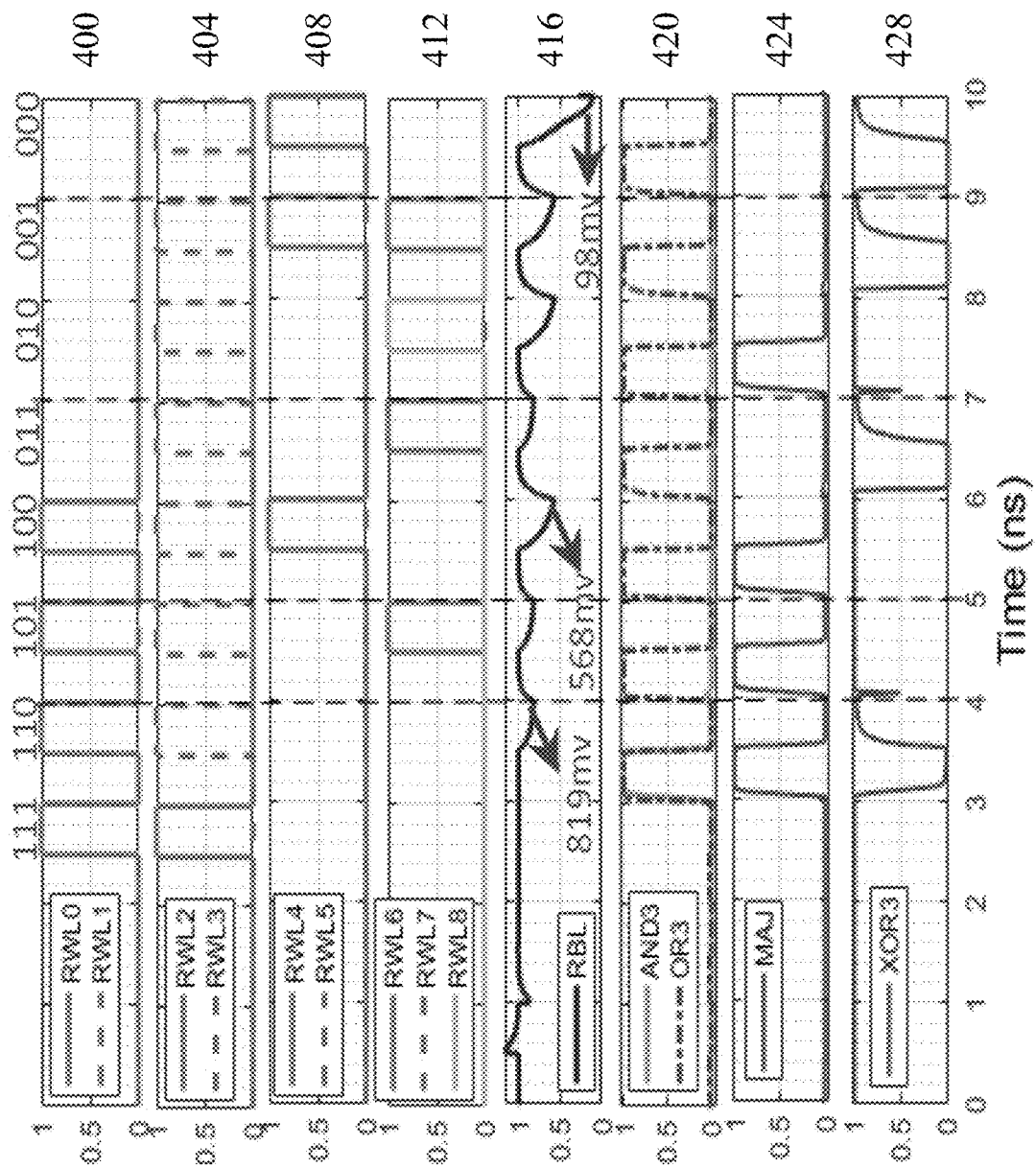
FIG. 4 is a graph representing exemplary in-memory logic simulation waveforms showing correct functionality.

All in-memory logic simulations are first shown in FIG. 4, showing correct functionality. Graphs 400, 404, 408, and 412 show timing diagrams of the Read Word-Line voltages. Graph 416 shows the analog voltage measured on the RBL over time, with the arrows indicating the discharge troughs when one, two, or all three bits are '0.' The measured discharge troughs may be used as voltage thresholds for the various comparison operations as disclosed herein in order to infer the bit values in the memory cells. A novel single-cycle in-SRAM XOR3 (full adder's Sum) logic is developed in step 204 and through an interesting observation as shown in the bottom-right truth table 324 of FIG. 3A. When the majority function (MAJ) output 424 is '0', the corresponding XOR3 output 428 (see timing diagram 428 in FIG. 4) is the same as the OR3 output shown in timing diagram 420. When the majority function output 424 is '1', the XOR3 output 428 matches the AND3 output shown in graph 420 (see truth table 324). Thus, a logic-SA as disclosed herein can simultaneously calculate the OR3 (420), MAJ (424), and AND3 (420) logic outputs. The XOR3 logic 428 may therefore be calculated as well via a two-transistor 2:1 multiplexer 332 (with the MAJ output 333 as the selector) in the disclosed reconfigurable logic-SA.

The Boolean logic of in-memory XOR3 428 can be given as XOR3=MAJ($S_i$, $S_j$, $S_k$)·AND($S_i$, $S_j$, $S_k$)+MIN($S_i$, $S_j$, $S_k$)·OR($S_i$, $S_j$, $S_k$), wherein '·' denotes AND logic and '+' denotes OR logic, so the Boolean equation may be rewritten as XOR3=OR(AND(MAJ($S_i$, $S_j$, $S_k$), AND($S_i$, $S_j$, $S_k$)), AND (MIN($S_i$, $S_j$, $S_k$), OR($S_i$, $S_j$, $S_k$))). In this way, assuming three vector operands are pre-stored in the memory, parallel in-memory full adder logic can be implemented for the first time in a single memory cycle, where MAJ and XOR3 outputs 424 and 428 generate the carry-out and Sum signals in step 205, respectively. Although some examples presented herein disclose three-bit logic operations, it is understood that two-input bit-wise operations may be readily implemented by initializing one row to '0' or '1' as appropriate. For example, an AND3 operation is readily converted to AND2 if one of the inputs is initialized to '1.' Similarly, an OR3 operation may be converted to OR2 if one of the inputs is initialized to '0,' and an XOR3 operation may be converted to XOR2 if one of the inputs is initialized to '0'.

The architecture described herein may be implemented in conjunction with various types of neural networks. In an embodiment, it may be used for artificial neural networks, convolutional neural networks, recurrent neural networks, or the like. In an embodiment, the hardware and software design may implement a binary weight neural network and may comprise image banks, kernel banks, PSRAM subarrays, or any of the components described herein. An example and further information are described herein with reference to FIG. 8.

Furthermore, an encryption algorithm may be implemented using the architecture design described herein. A message may be transformed into cyphertext as a result of using the PSRAM design described above. Further exploration of the use of the architecture in encryption algorithms is described below with reference to Table IV.

Experimental Examples

The invention is further described in detail by reference to the following experimental examples. These examples are provided for purposes of illustration only and are not intended to be limiting unless otherwise specified. Thus, the invention should in no way be construed as being limited to the following examples, but rather, should be construed to encompass any and all variations which become evident as a result of the teaching provided herein.

Figure 5:
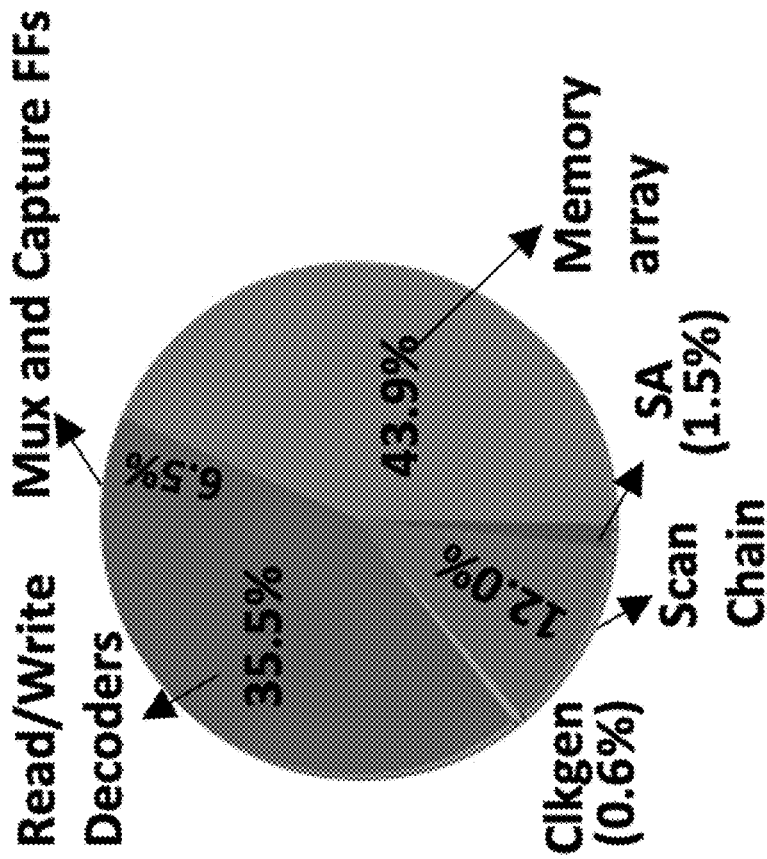
FIG. 5 illustrates an exemplary die micrograph with a core area breakdown.
Figure 5:
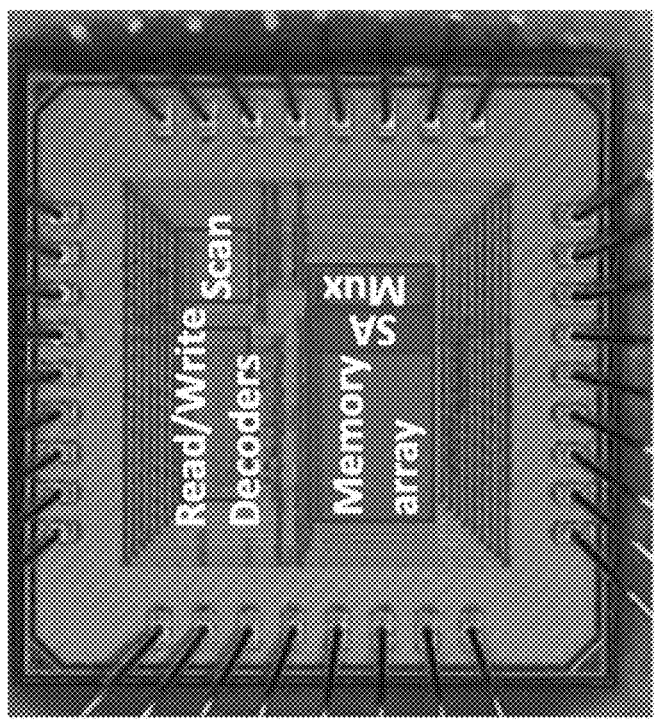
Figure 6A:
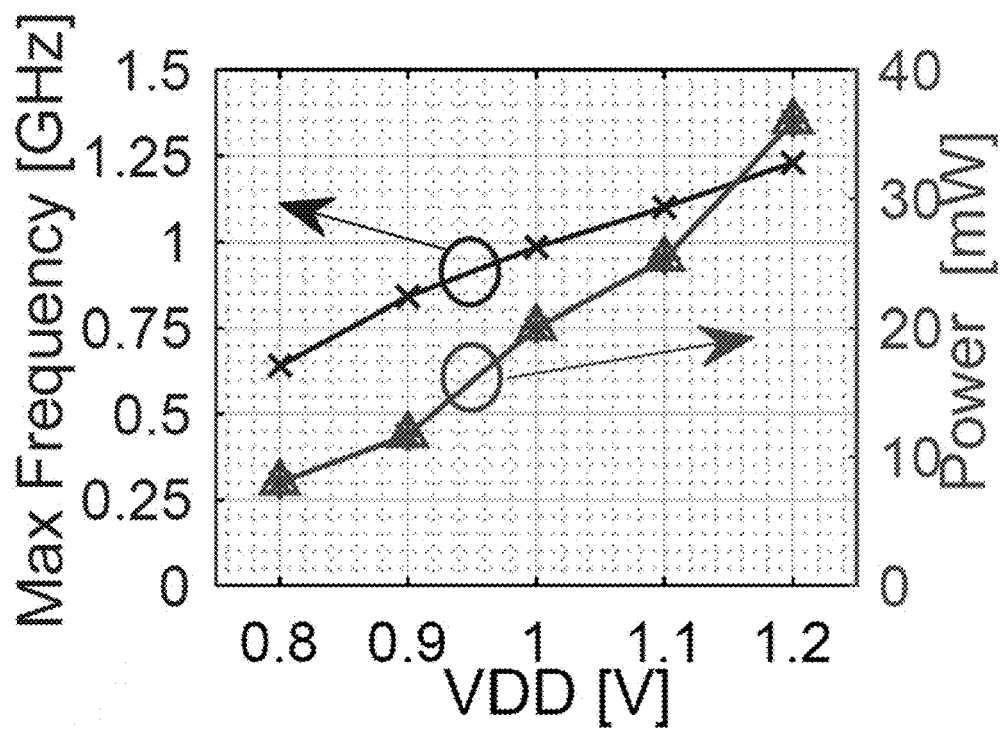
FIG. 6A shows a graph illustrating frequency scaling over different operating voltages of the chip (VDDs).
Figure 6B:
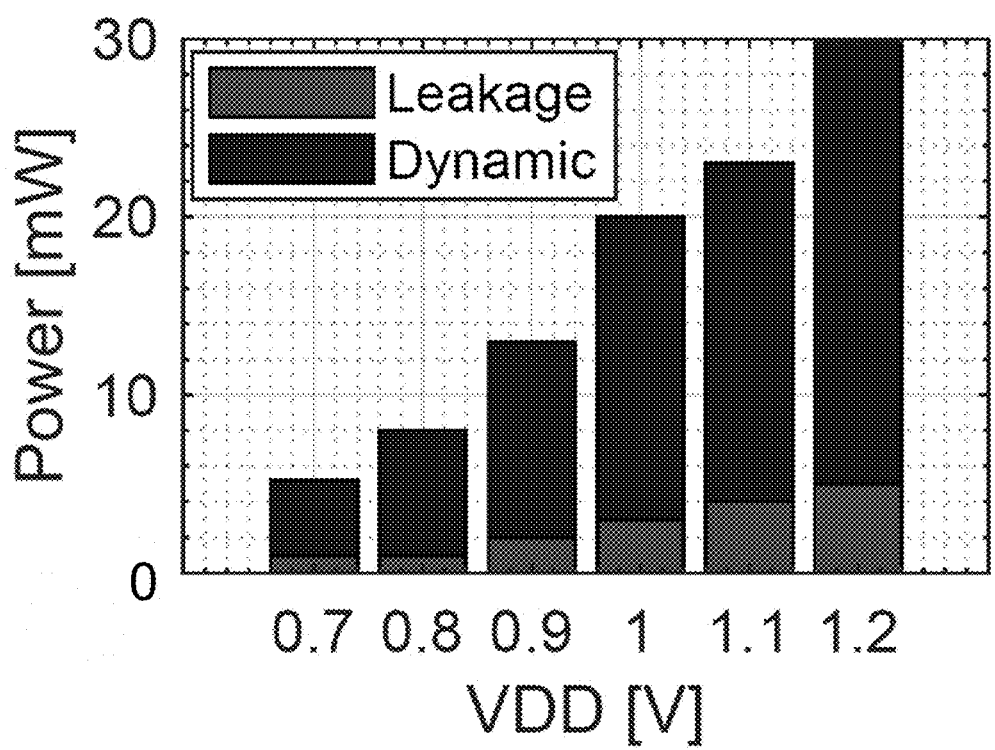
FIG. 6B represents a graph of the static and dynamic power consumption of the system.
Figure 6C:
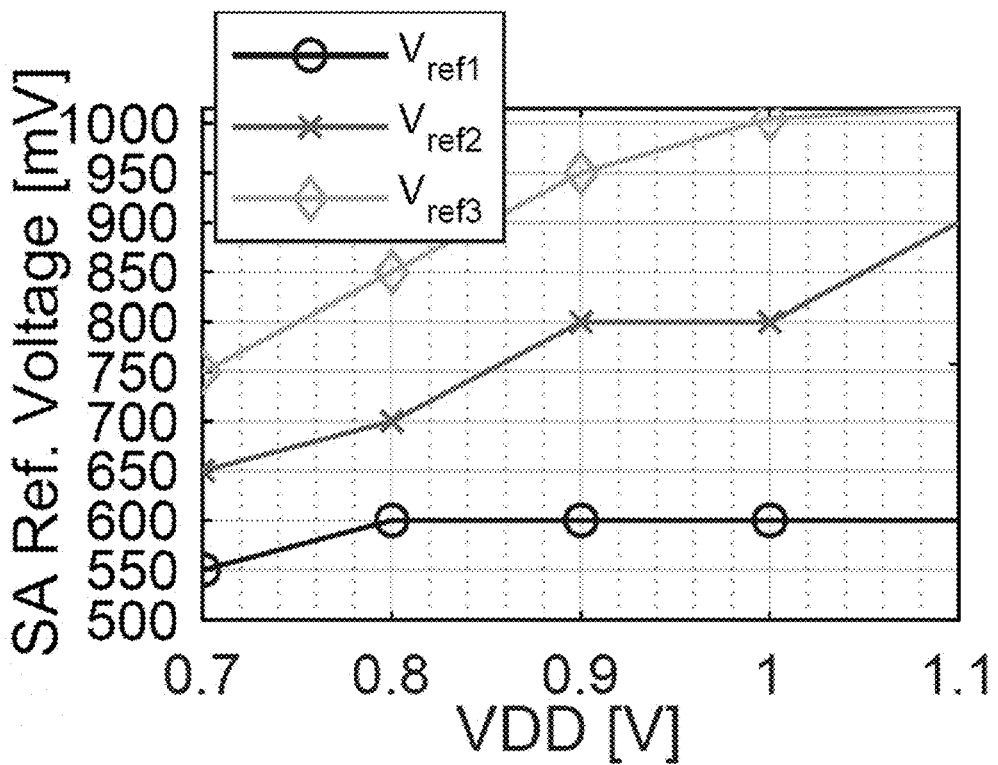
FIG. 6C is a graph showing the Vref scaling over different VDDs.
Figure 6D:
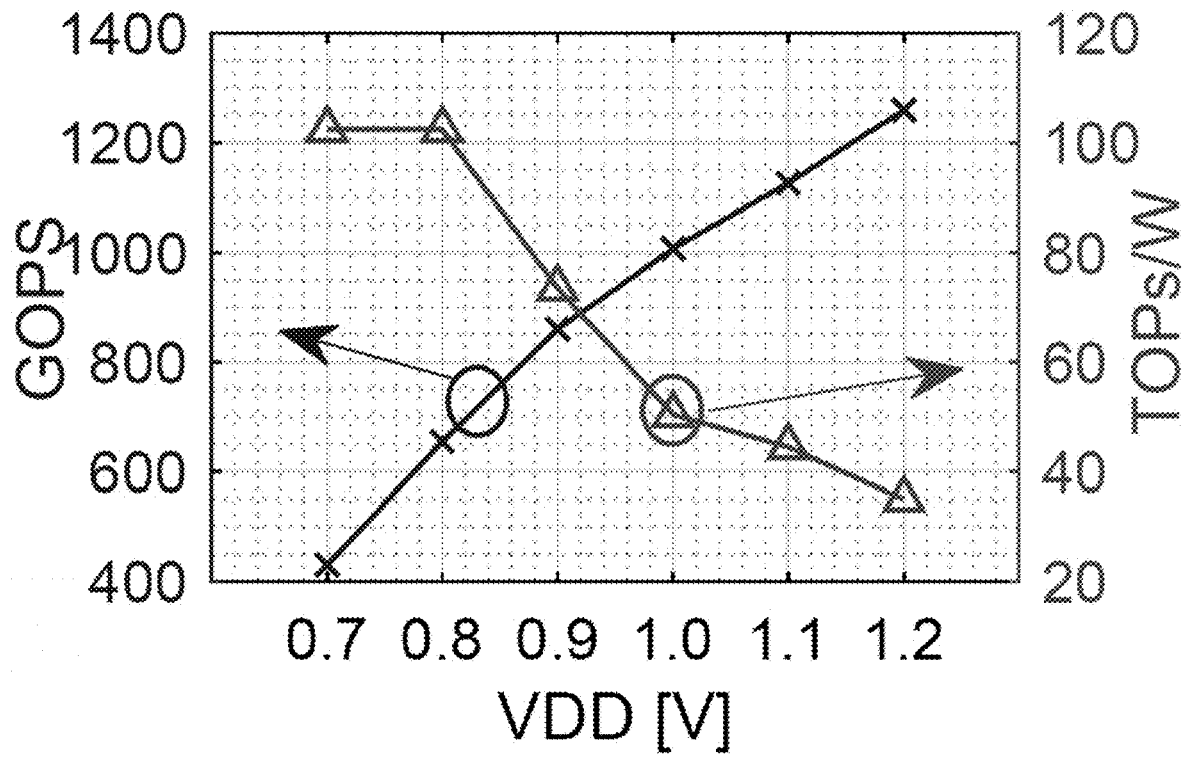
FIG. 6D illustrates a graph representing throughput scaling of the chip over different VDDs.

Without further description, it is believed that one of ordinary skill in the art can, using the preceding description and the following illustrative examples, make and utilize the system and method of the present invention. The following working examples, therefore, specifically point out the exemplary embodiments of the present invention and are not to be construed as limiting in any way the remainder of the disclosure Measurement Results A. Performance Measurement The PSRAM macro (128×128) was prototyped in TSMC 65 nm complementary metal-oxide-semiconductor (CMOS) as shown in FIG. 5. The macro as fabricated had a 2-kilobyte capacity and occupied 0.17 mm$^2$ with a decoder in the chip floorplan. The bit-cell had an area of 4.56 μm$^2$ (1080 F$^2$ when scaled according to feature size), was designed using logic rules. For efficient integration, the sense amplifiers were pitch matched with reference to the column and occupy 3.4% of the array size (0.082 mm$^2$). The complete core area breakdown is shown in FIG. 5. The PSRAM macro consumed 36 pJ, including power consumed by all components on the die, and took 813 ps to generate 512 outputs of the complete 3 input logic set (AND3, XOR3, OR3, MAJ). This represents a peak throughput of 2×128×4/813 ps=1259.52 GOPs at 1.2 volts supply and a compute density of 583.12 GOPS/mm$^2$. PSRAM achieves a significant speedup of over 4-157× when compared to state-of-the-art in-memory computing works (A. Biswas et al., IEEE JSSC, 2018; J. Wang et al., IEEE JSSC, 2020; H. Valavi et al., IEEE JSSC, 2019; Y. Zhang et al., IEEE JSSC, 2018). The maximum frequency, power consumption, and throughput with reference to different operating voltages of the chip is reported in FIGS. 6A, 6B, 6C, and 6D respectively.

B. Sense Amplifier Reference Voltage Analysis

Figure 7:
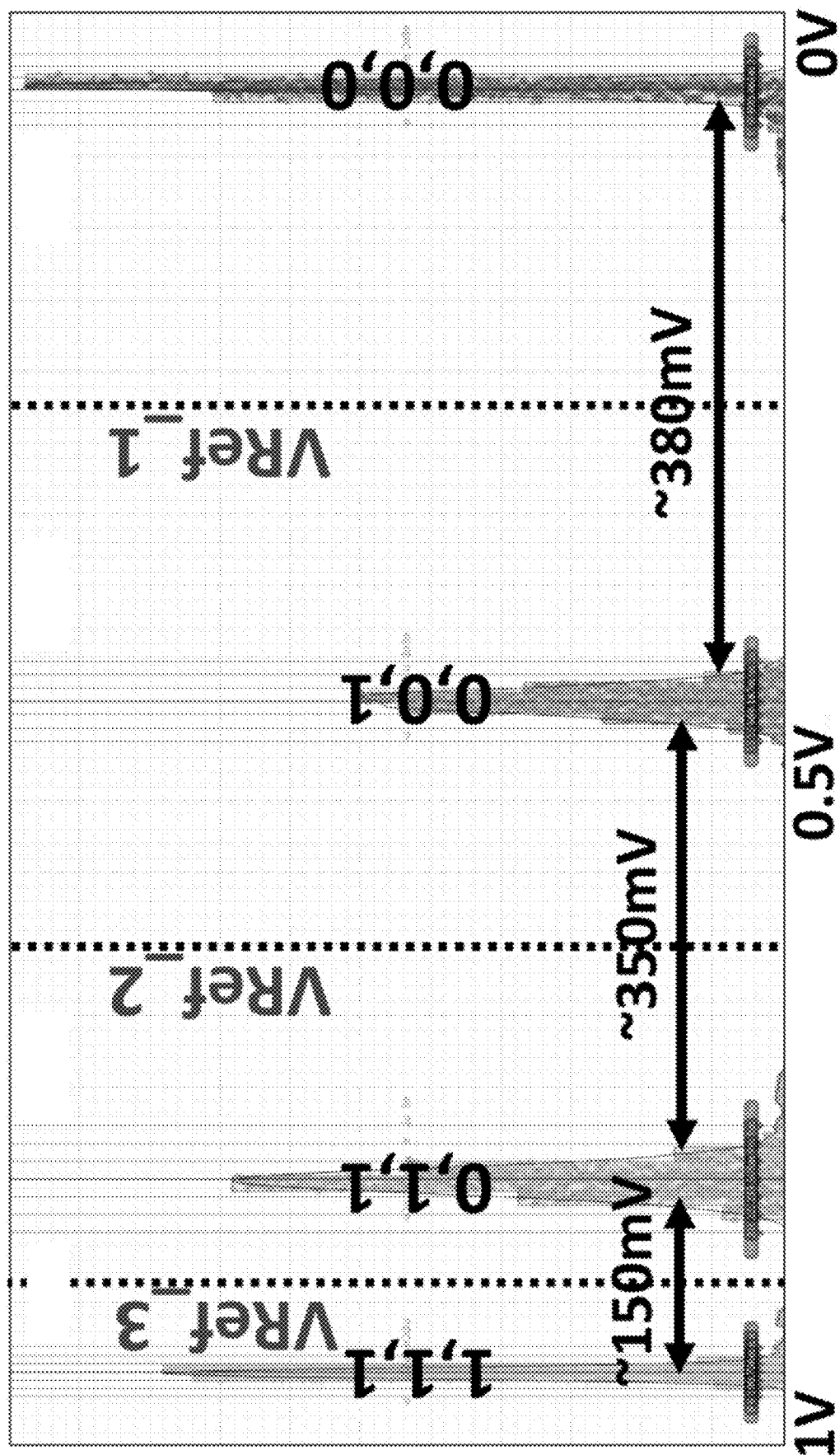
FIG. 7 represents a graph showing Monte-Carlo Simulations.

The RBL sense margins were first tested through post-layout Monte Carlo simulations in Cadence Spectre for the four possible sensing voltages, as shown in FIG. 7. The sensing margin is reported considering both process (inter-die) and mismatch variations (intra-die) for core operating voltages (1.0 V) at 1 GHz. During the chip measurements, off-chip voltage references were provided (Vref) to the SAs. To conduct the Vref variation analysis on chip, all 128 bit-lines, 100 times, were tested for all possible bit value combinations in memory. 10 chips were tested and all the reference voltage ranges measured at different VDDs are reported along with the corresponding maximum frequencies with zero logic errors in Table I shown below. It is found that at lower voltages, the maximum operating frequency is limited by the shrinking of Vref ranges. A higher VDD also yields a larger sensing margin.

TABLE I

Measured Reference Voltage Ranges

| VDD/V$_{ref}$ | V$_{ref\_1}$(V) | V$_{ref\_2}$(V) | V$_{ref\_3}$(V) |
|---|---|---|---|
| 0.7 V @ 0.42 Ghz | 509 m-546 m | 6083 m-647 m | 658 m-693 m |
| 0.8 V @ 0.64 Ghz | 452 m-616 m | 620 m-733 m | 745 m-780 m |
| 0.9 V @ 0.84 Ghz | 414 m-661 m | 669 m-750 m | 829 m-889 m |
| 1.0 V @ 0.984 Ghz | 503 m-711 m | 735 m-902 m | 908 m-995 m |
| 1.1 V @ 1.1 Ghz | 550 m-754 m | 760 m-994 m | 999 m-1.083 |
| 1.2 V @ 1.23 Ghz | 554 m-790 m | 815 m-1.08 | 1.09-1.16 |

Case Study I: Bulk Bitwise Boolean Vector Operations

The PSRAM was leveraged to implement bulk bitwise Boolean logic operations efficiently between vectors stored in the same memory sub-array. This led to efficient re-use of the internal memory bandwidth. Table II below compares the latency for a set of vector operations of interest, implemented by three generic PIM designs. The JSSC '18 PIM design is from Y. Zhang, et al., IEEE JSSC, 2018, and the JSSC '20 PIM design is from J. Wang, et al., ISSS JSSC, 2020.

TABLE II

Latency Comparison of Vector Boolean Logic Operations Supported by PSRAM and Prior Accelerators

| Parameters | JSSC '18 | JSSC '20 | PSRAM |
|---|---|---|---|
| Capacity (KB) | 8 | 16 | 2 |
| Technology (nm) | 40 | 28 | 65 |
| Frequency (GHz) | 0.029 | 0.475 | 1.23 |
| NOT (ns/# of Cycle) | 34.72/1 | 2.1/1 | 0.81/1 |
| NAND2 (ns/# of Cycle) | 34.72/1 | 2.1/1 | 0.81/1 |
| NAND3 (ns/# of Cycle) | 69.44/1 | 4.2/1 | 0.81/1 |
| NOR2 (ns/# of Cycle) | 34.72/1 | 2.1/1 | 0.81/1 |
| NOR3 (ns/# of Cycle) | 69.44/1 | 4.2/1 | 0.81/1 |
| X(N)OR2 (ns/# of Cycle) | 34.72/1 | 2.1/1 | 0.81/1 |
| XOR 3 (ns/# of Cycle) | 69.44/1 | 4.2/1 | 0.81/1 |
| Majority (ns/# of Cycle) | N/A | N/A | 0.81/1 |
| FULL-ADD (ns/# of Cycle) | 69.44/1 | 4.2/1 | 0.81/1 |
| FULL-SUB (ns/# of Cycle) | 69.44/1 | 4.2/1 | 1.62/2 |
| ADD-RCA (4-bit) (ns # of Cycle) | N/A | N/A | 3.24/4 |
| ADD-CSA (4-bit) (ns # of Cycle) | N/A | N/A | 4.05/5 |
| ADD-Serial (4-bit) (ns)* | 173.6 | 10.5 | 4.05 |
| SUB-Serial (4-bit) (ns)** | 312.48 | 18.9 | 7.29 |
| Mult-Serial (4-bit) (ns)*** | 1180.48 | 71.4 | 27.54 |
| Mult-Serial (8-bit) (ns) | 3541.44 | 214.2 | 82.62 |

*N + 1 cycles,
**2N + 1 cycles,
***N$_2$ + 5N−2 cycles

The best performance of each design was achieved, where input vectors A($a_0a_1$ . . . ), B($b_0b_1$ . . . ) and C($c_0c_1$ . . . ) were stored in separate rows of the memory. From Table II, the PSRAM is the only design that supports a full-set of Boolean logic (both 2-input and 3-input) and integer operations. Additionally, due to the complexity of some operations (e.g., ADD/SUB/MULT), the operations cannot be implemented in a time-efficient manner by the prior designs (J. Wang et al., IEEE JSSC, 2020; Y. Zhang et al., IEEE JSSC, 2018), while PSRAM outperforms all prior works in latency.

Case Study II: Binary-Weight Neural Networks

Figure 8:
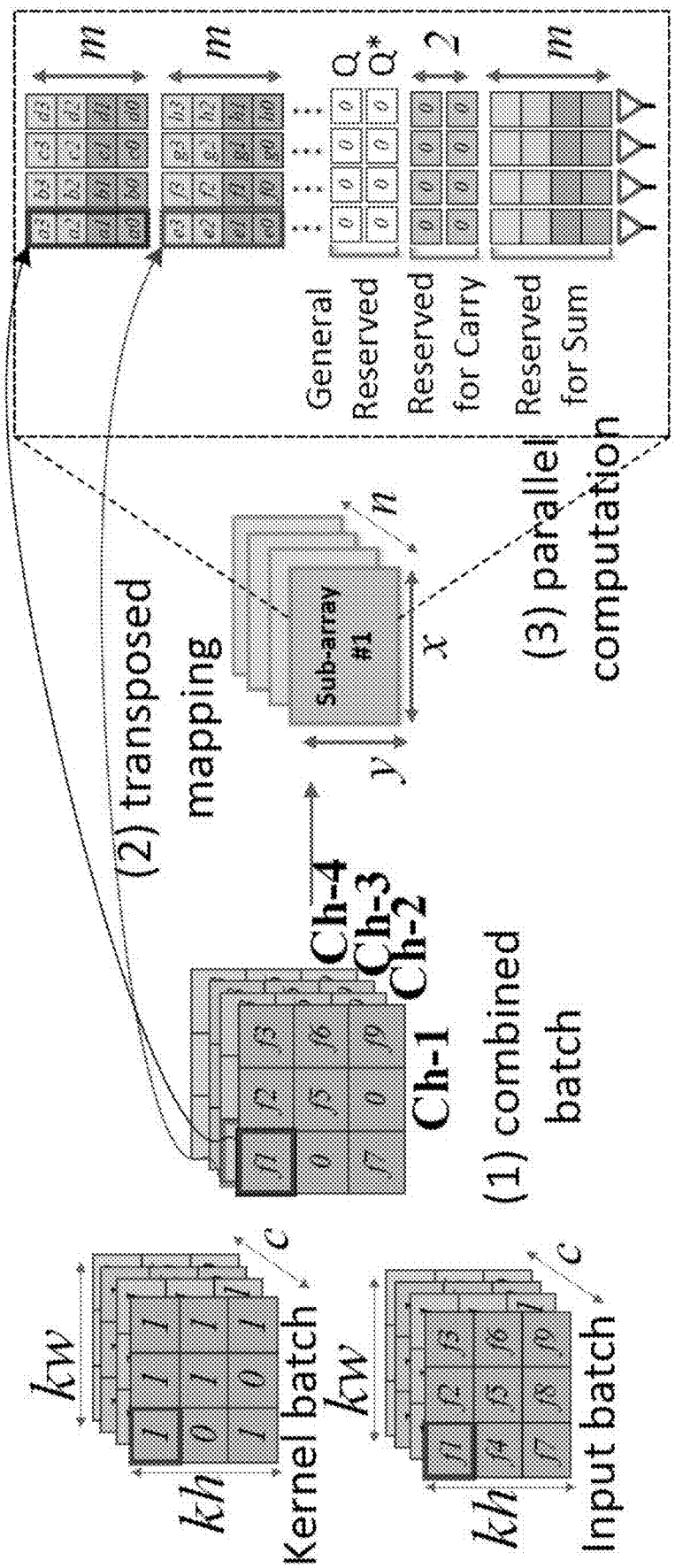
FIG. 8 is a diagram illustrating the memory sub-array binary-weight neural network hardware data mapping for a PSRAM.
Figure 9B:
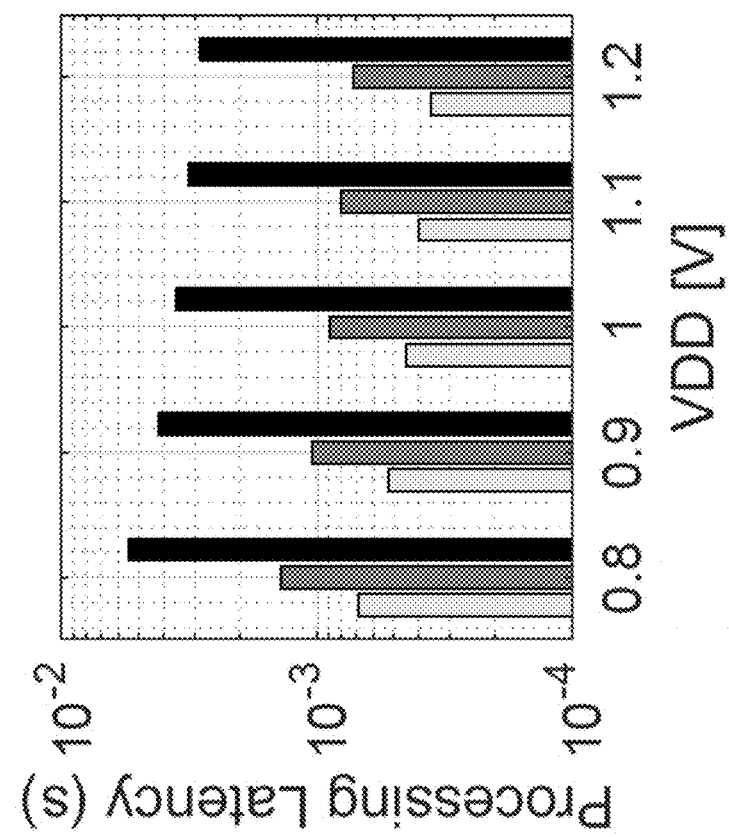
FIG. 9B is a bar graph representing the processing time for running the AlexNet (ImageNet dataset).
Figure 9A:
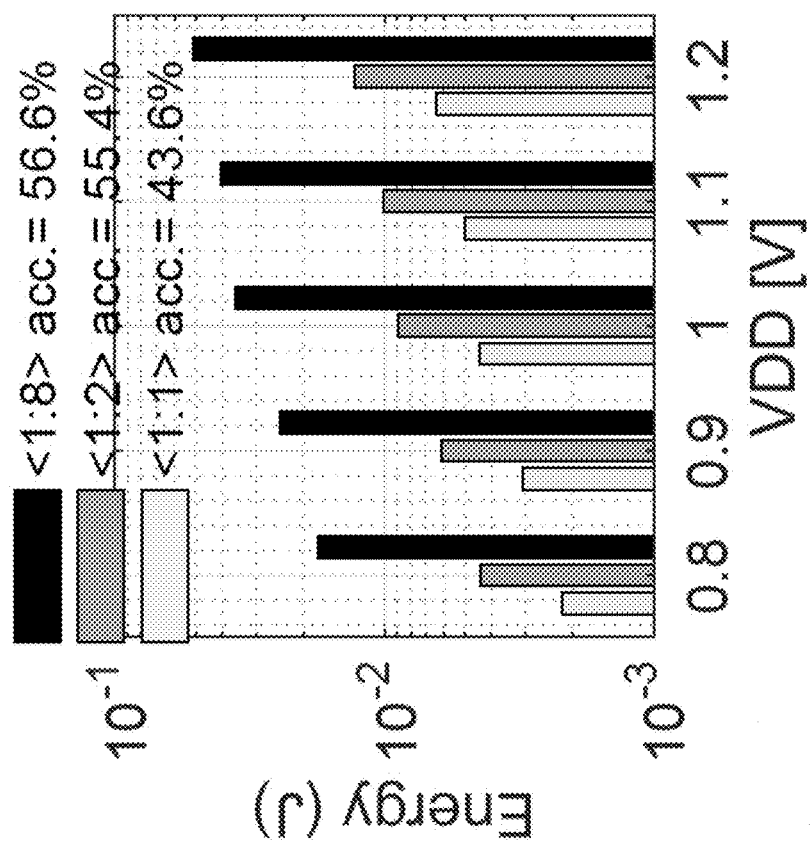
FIG. 9A is a bar graph showing the PSRAM energy consumption.

The binary-weight neural network (BWNN) was also implemented but with various weight configurations for AlexNet and the energy, latency and other performance are reported in Table III below and FIGS. 9A and 9B. The general hardware/software framework developed for BWNN includes image and kernel banks, and PSRAM sub-arrays as explained before. Weights and activation were constantly quantized to 1-bit and q-bit using the same method as J. Faraone et al., in CVPR, 2018, respectively, and then mapped to the parallel PSRAM sub-arrays. The top-1 accuracy after quantization on the ImageNet dataset is reported in FIGS. 9A and 9B. For hardware mapping, considering n-activated PSRAM chips with the size of 128×128 (FIG. 8), each sub-array can handle the parallel ADD/SUB1 of up to 128 elements of m-bit (2m≤128) and so accelerator could process n×128 elements simultaneously within computational sub-arrays to maximize the throughput. The memory sub-array data mapping for PSRAM is depicted in FIG. 8.

Four rows were reserved for Carry results initialized with zeros and up to 32 rows for Sum results. Every pair of corresponding elements to be added together is aligned in the same bit-line. Herein, channel 1 (Ch1) and channel 2 (Ch2) are in some embodiments aligned in the same sub-array. With m=32-bit, Ch1 elements occupy the first 32 rows of the sub-array followed by Ch2 in the next 32 rows. The addition algorithm starts bit-by-bit from the LSBs of the two words and continues towards MSBs. For evaluation, a 7-layer BWNN is adopted with distinct weight configurations of <W:I>: <1:1>, <1:2>, <1:8>. The evaluation result reported in FIGS. 9A and 9B shows that PSRAM can process AlexNet on average with 35 mJ energy per inference and ~0.5 ms latency. The process energy and latency include the amount required by multiple PSRAM chips working as a whole entity. More detailed performance comparison with other recent SRAM based PIM designs are reported in Table III.

TABLE III

Comparison with State-of-the-art SRAM based PIM Accelerators

| Reference | PSAM | BWNN Accelerators | | Generic Accelerators | |
|---|---|---|---|---|---|
| | | JSSC '19 [1] | JSSC '19 [3] | JSSC '20 [2] | JSSC '20 [4] |
| Technology | 65 nm | 65 nm | 65 nm | 28 nm | 40 nm |
| Bit cell Density | 8 T | 10 T | 8 T | 8 T Transposable | 10 T |
| Supply Voltage | 0.8-1.2 V | 0.8-1.2 V | 0.68-1.2 V | 0.6-1.1 V | 0.5-0.9 V |
| Max Frequency | 1230 MHz (1.2 V) | 5 MHz | 100 MHz | 475 MHz (1.1 V) | 28.8 MHz (0.7 V) |
| SRAM Macro Size | 2 KB | 2 KB | 4.8 KB | 16 KB | 8 KB |
| Performance (GOPS) | 1259.52 | 8 | 295 | 32.7 | 14.7 |
| Performance per unit Area (GOPS/mm$_2$) | 583.12 | 126 | 23.4 | 27.3 | 70 |
| Energy Efficiency (TOPS/W) | 34.98 | 40.3 | 20.6 | 5.27 (add) 0.55 (Mult) | 31.28 |
| Reconfigurable | Programmable | N/A | N/A | Programmable | N/A |

Case Study III: Data Encryption

Figure 10:
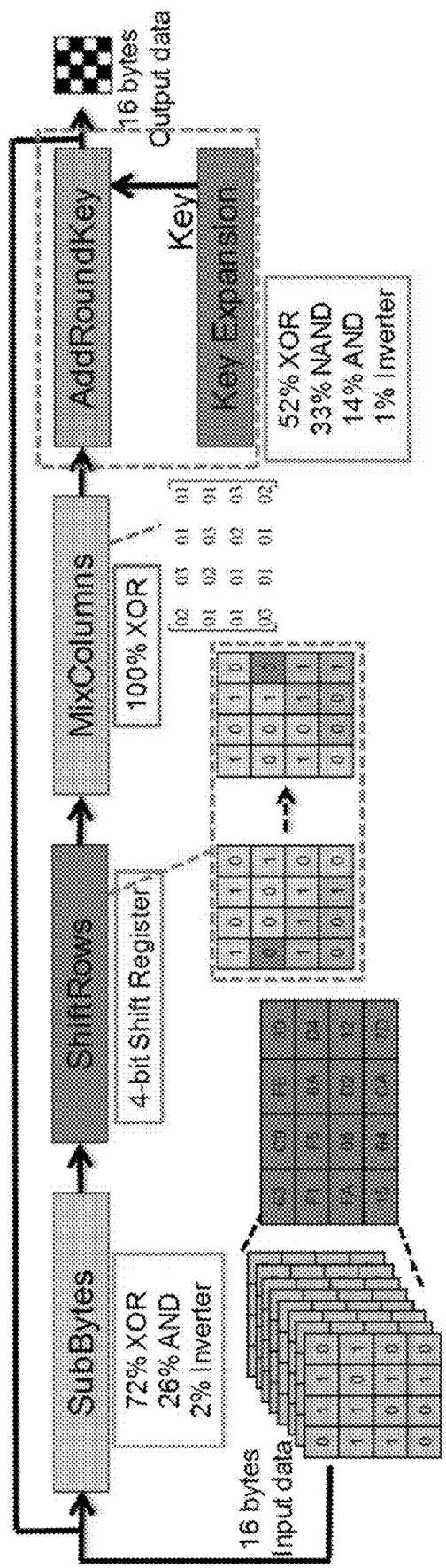
FIG. 10 illustrates an Advanced Encryption Standard (AES) block diagram with gate utilization.

The Advanced Encryption Standard (AES) data encryption algorithm is used as the third case-study. To facilitate working with input data (with a standard input length of 128 bits), each input byte data was distributed into 8-bits such that eight PSRAM sub-arrays are filled by 4×4 bit-matrices (S. Mathew et al., in 2010 Symp. on VLSI. IEEE.) After mapping, PSRAM supports the required AES bulk bit-wise operations to accelerate each transformation inside the memory. As shown in FIG. 10, all AES transformations were mainly based on (N)AND and XOR operations that are fully supported in PSRAM. In SubBytes, MixColumns, and AddRoundKey stages, parallel in-memory XOR2 and (N)AND2 operations contribute to more than 90% of the operations. In the ShiftRows stage, the state matrix undergoes a cyclical shift operation by a certain offset.

The 128-bit AES software implementation from Y. Zhang et al., IEEE JSSC, 2018. is used as the baseline, a 350 nm ASIC from M. Hutter et al., IFIP, 2011; and a 40 nm ASIC also from Y. Zhang et al. IEEE JSSC, 2018. designs for comparison. Table IV below shows that PSRAM achieves the highest speed-up over baseline. This mainly comes from the massively parallel and high throughput XOR operation supported in PSRAM.

TABLE IV 128-bit AES Performance

| Platforms | # of Cycles | Frequency (MHz) | Time (μS) (Norm.) | Energy (nJ) (Norm.) |
|---|---|---|---|---|
| Baseline [4] | 6358 | 24 | 265 (1x) | 64.2 (1x) |
| [8] | 5429 | 0.847 | 6410 (24x) | 10259 (160x) |
| Recryptor [4] | 726 | 28.8 | 25.2 (0.1x) | 7.05 (0.11x) |
| PSRAM | 718 | 1230 | 0.58 (0.002x) | 19.21 (0.3x) |

REFERENCES

The following publications are incorporated herein by reference in their entirety.
- A. Biswas et al., "Conv-sram: An energy-efficient sram with in-memory dot-product computation for low-power convolutional neural networks," IEEE JSSC, 2018.
- J. Wang et al., "A 28-nm compute SRAM with bit-serial logic/arithmetic operations for programmable in-memory vector computing," IEEE JSSC, 2020.
- H. Valavi et al., "A 64-tile 2.4-mb in-memory-computing cnn accelerator employing charge-domain compute," IEEE JSSC, 2019.
- Y. Zhang et al., "Recryptor: A reconfigurable cryptographic cortex-m0 processor with in-memory and near-memory computing for iot security," IEEE JSSC, 2018.
- J. Yue et al., "14.3 a 65 nm computing-in-memory-based cnn processor with 2.9-to-35.8 tops/w system energy efficiency using dynamic-sparsity performance-scaling architecture and energy-efficient inter/intra-macro data reuse," in IEEE ISSCC, 2020.
- J. Faraone et al., "Syq: Learning symmetric quantization for efficient deep neural networks," in CVPR, 2018.
- S. Mathew et al., "53 gbps native gf (2 4) 2 composite-field aes-encrypt/decrypt accelerator for content-protection in 45 nm high performance microprocessors," in 2010 Symp.on VLSI. IEEE.
- M. Huffer et al., "A cryptographic processor for low-resource devices: Canning ecdsa and aes like sardines," in IFIP, 2011.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A system for in-memory computing, comprising:
   a volatile memory comprising at least a first layered subarray, wherein each subarray comprises a plurality of memory cells; and
   a plurality of sub-sense amplifiers connected to a read bitline of the first subarray of the memory, configured to compare a measured voltage of the read bitline to a threshold corresponding to the distinct logic operation and provide a binary output corresponding to the distinct logic operation based on whether the voltage of the read bitline is above or below the threshold.

2. The system of claim 1, wherein the logic operation is selected from NOR, XOR, and NAND.

3. The system of claim 1, wherein the plurality of sub-sense amplifiers comprises three sub-sense amplifiers; and
   wherein the at least one threshold comprises at least three thresholds, corresponding to NOR, XOR, and NAND logic operations.

4. The system of claim 1, further comprising a multiplexer connected to the binary outputs of the plurality of sub-sense amplifiers, configured to select one of the binary outputs in response to a control signal.

5. The system of claim 1, wherein the memory is a random-access memory.

6. The system of claim 5, wherein the random-access memory is an in-processing static random-access memory (SRAM).

7. The system of claim 1, wherein the plurality of memory cells are 8T SRAM cells.

8. The system of claim 4, wherein the multiplexer is selected from a 2:1 multiplexer, a 3:1 multiplexer, and a 4:1 multiplexer.

9. A method of in-memory computing, comprising:
   storing a set of data in a layered subarray of a volatile memory;
   comparing, with a set of sub-sense amplifiers, an analog voltage of a read bitline of the volatile memory to a set of corresponding voltage references, each voltage reference corresponding to a digital logic operation;
   providing a set of corresponding binary output values from the sub-sense amplifiers; and
   selecting, with a multiplexer, one of the set of corresponding binary output values.

10. The method of claim 9, wherein the three memory rows are three operand vectors stored in a memory.

11. The method of claim 9, wherein the memory is a random-access memory.

12. The method of claim 11, wherein the random-access memory is an in-processing static random-access memory (SRAM).

13. The method of claim 10, wherein the method is performed in a single memory cycle.

14. The method of claim 9, wherein the set of corresponding binary output values are three-input logic operations.

15. The method of claim 14, wherein the three-input logic operations are selected from XOR3, AND3, NOR3, and OR3.

16. The system of claim 1, wherein the plurality of sub-sense amplifiers comprises three sub-sense amplifiers connected to the read bitline of the first subarray of the memory, each of the three sub-sense amplifiers dedicated to distinct logic operations and are configured to, during a single memory read cycle, compare the measured voltage of the read bitline to the threshold corresponding to the respective distinct logic operation and provide the binary output corresponding to the respective distinct logic operation based on whether the voltage of the read bitline is above or below the threshold.

17. The system of claim 16, wherein a first sub-sense amplifier is configured to compare the measured voltage to a first threshold, wherein a second sub-sense amplifier is configured to compare the measured voltage to a second threshold, and third sub-sense amplifier is configured to compare the measured voltage to a third threshold.

18. The system of claim 16, wherein a first sub-sense amplifier is configured to perform a NOR logic operation, a second sub-sense amplifier is configured to perform a XOR logic operation, and a third sub-sense amplifier is configured to perform a NAND logic operation.

19. The system of claim 1, wherein the plurality of sub-sense amplifiers are simultaneously connected to the read bit line and configured to derive contents of the plurality of memory cells based on a fall time of the read bit line.

* * * * *